(12) United States Patent
Dennis (10) Patent No.: US 6,195,699 B1
(45) Date of Patent: Feb. 27, 2001

(54) REAL-TIME SCHEDULER METHOD AND APPARATUS

(75) Inventor: Jack B. Dennis, Belmont, MA (US)

(73) Assignee: Acorn Networks, Inc., Reston, VA (US)

( * ) Notice: Subject to any disclaimer, the term of this patent is extended or adjusted under 35 U.S.C. 154(b) by 0 days.

(21) Appl. No.: 09/185,311

(22) Filed: Nov. 3, 1998

(51) Int. Cl.[7] .................................................. G06F 13/00
(52) U.S. Cl. ........................ 709/229; 709/200; 709/234; 370/395; 370/397
(58) Field of Search .................................. 709/200, 229, 709/234; 370/395, 397, 232, 416, 412

(56) References Cited

U.S. PATENT DOCUMENTS

| | | | |
|---|---|---|---|
| 5,579,302 | * 11/1996 | Banks ..................................... | 370/397 |
| 5,732,087 | * 3/1998 | Lauer et al. .......................... | 370/416 |
| 5,940,397 | * 8/1999 | Gritton ................................. | 370/412 |
| 5,987,031 | * 11/1999 | Miller et al. ......................... | 370/395 |
| 5,991,867 | * 11/1999 | Fosmark ............................... | 370/232 |
| 6,011,798 | * 1/2000 | Fosmark ............................... | 370/232 |
| 6,046,981 | * 4/2000 | Ramamurthy et al. .............. | 370/232 |

OTHER PUBLICATIONS

Kim at. al., "Scalable Hardware Earliest–Deadline–First Scheduler for ATM Switching", IEEE, Dec. 1997.*

* cited by examiner

Primary Examiner—Zarni Maung
Assistant Examiner—Philip B. Tran
(74) Attorney, Agent, or Firm—Morse, Altman & Martin (57) ABSTRACT

A real-time scheduler for scheduling periodic access to a shared resource by a number of channels. The channel period for each channel is represented by a channel value partitioned into an extra-fine value, a fine value, and a coarse value. The fine value is in units of access intervals, the length of time of each access. The coarse value is in units of scheduling periods, the maximum number of access intervals that can be represented by the fine value. The extra-fine value is in units of a number that evenly divides the access interval. During each scheduling period all non-zero coarse values are decremented by one and then if zero, indicate that the next cell send time for that channel falls in the next scheduling period. Concurrently, a fine process executes repeatedly in which all fine values that had a zero coarse value at the end of the previous scheduling period are compared to find the smallest value. The scheduler waits until the smallest value is less than or equal to the current cell interval, and then outputs a trigger signal to initiate the sending of the next cell of the channel and to adjust the channel value using the channel period such that the extra-fine value overflows into the fine value.

14 Claims, 5 Drawing Sheets

REAL-TIME SCHEDULER METHOD AND APPARATUS

GOVERNMENT FUNDING

The research involved in this application was funded in part by the Naval Research Laboratory, contract number N00014-95-C-2216, dated Aug. 28, 1995. The intellectual property rights of the applicant and the government of the United States of America are governed by Title 37 Code of Federal Regulations Part 401.

BACKGROUND OF THE INVENTION

1. Field of the Invention

The present invention relates to real-time resource scheduling, more specifically, to a method and apparatus for the real-time scheduling of a shared resource in an information system such as in digital communications between terminals of a communications network.

2. The Prior Art

When two computers wish to communicate with each other, they do so via a communications network. Networks are composed of computers and other terminal devices, such as printers, (collectively, computers) that are interconnected by electrical or optical cables. The capacity of a cable, also called its bandwidth, is measured in bits per second. The sum of the bit rates over all connections supported at one time by a cable cannot exceed its capacity.

Many networks are networks within networks, that is, larger networks composed of smaller networks connected together. For example, a company may have a local area network (LAN) in one of its offices that ties together all of the computers in that office. It then has a wide area network (WAN) that ties together the local networks of all of its offices. The company WAN may then be connected to a larger WAN, such as the Internet, a global network of thousands of smaller networks and computers. Generally, a network is connected to another network at one point, the gateway, where a hardware device, the interworking unit (IWU), acts as a translator between the different communications protocols and bit rates of the connected networks.

In general, information transferred from one computer to another over a network is not sent continuously. The information is broken up into segments, called packets, each of which is prefixed with a header and sent. The header may contain various information, such as the address of the source computer, the address of the destination computer, and the position of the packet in the totality of information sent from the source to the destination. The later is necessary when it cannot be assumed that all the packets will reach the destination by the same route, implying that the packets may arrive at the destination in a different order than they are sent. In the typical network, the amount of time that it takes to transmit each packet is the packet transmission interval, and is determined by dividing the length of the packet, in bits, by the bit rate of the network.

With the proliferation in the number and power of computers and the desire for computers to communicate at increasingly higher speeds, network bit rates must continue to increase to keep up with the demand for their services. Some WAN lines currently run at bit rates of up to 2.4 Gb/s using asynchronous transmission mode (ATM) standards, with higher rates anticipated. In an ATM system, each information packet is sent as a series of fixed-size cells. At 2.4 Gb/s, a 53-octet ATM cell has a cell interval of (53 octets*8 bits/octet)/2.4 Gb/s=176 nanoseconds (ns).

When it is desired to send information from a source system to a destination system, a virtual connection (VC) is set up. A VC is a logical connection between the systems. The physical transmission path (which may include electrical wires, optical fibers, and intervening computers) will often have segments that are shared by several VC's. Of course, the physical medium used for each segment must provide sufficient bandwidth to meet the requirements of all VC's set up through it.

In a segment of a transmission path, packets can be transferred synchronously or asynchronously. In synchronous transfer mode (STM), data is transferred within equal time periods, or frames, which are themselves composed of time slots. The number of time slots in each frame typically is the same as the maximum number of VC's. A VC that passes through an STM segment is assigned one slot within the frame. Consequently, all channels using this transmission segment have the same fixed bandwidth, regardless of actual need. If the fixed bandwidth is more than is necessary for the VC, some of the bandwidth is wasted. Conversely, if the fixed bandwidth is less than is necessary, some information may be lost.

In asynchronous transfer mode (ATM), there are no frames. Packets are allocated time slots when needed. Consequently, each VC only uses the bandwidth that it needs. When a system wishes to send information over an ATM network, it sends a request to the network controller for a VC that will run at a specified bandwidth. The VC is allocated and the interval of time between cells necessary to meet the bandwidth requirement, the rate period, is determined. Then the cells are sent one at a time during an access interval, called a cell interval in communications systems, separated by the rate period. The network controller must determine which cell to assign to each cell interval. Because the number and assignments of VC's change dynamically, it is not generally possible to make cell interval assignments in advance. Thus, each cell interval assignment must be made in real time during the previous cell interval, which means that the transmitting unit only has the amount of time in a cell interval (176 ns in the 2.4 Gb/s example above) to make the next assignment.

In present day ATM transmission equipment, the scheduling of transmission of ATM cells is typically implemented using a scheduling table that contains an arbitrary number of entries. Each entry in the table specifies a particular virtual channel (VC) and each VC may appear in many entries of the table. Sometimes, the table has a hierarchical structure. The scheduler cycles through the table repeatedly, processing one entry every cell interval. This method is simple, but has several problems, including the difficulty of maintaining the table as VC's become active or inactive, and the limited accuracy of the channel period due to the finite size of the table.

SUMMARY OF THE INVENTION

An object of the present invention is to provide an apparatus for determining in real time which cell to assign to each cell interval in an asynchronous transfer mode communications network that serves a number of virtual channels.

Another object is to provide such an apparatus that can be reconfigured in real time to accommodate various parameters of an asynchronous transfer mode communications network, including dynamic activation and deactivation of virtual channels and changing rate periods of virtual channels.

The real-time scheduler of the present invention may be used to schedule service of multiple periodic requests for access to a shared resource. An important example is determining when each virtual channel of an asynchronous transfer mode communications system can use the single transmission line.

The real-time scheduler includes a set of inputs, a scheduling table, an arithmetic unit (ALU), a smallest value logic block (SVL), and a comparator. The significant inputs are the channel periods and the channel active indicators. The channel period is the ideal time between which cells of a single channel should be sent and the channel active indicators indicate whether a channel is currently active in systems that have dynamically activated and deactivated channels.

The scheduling table stores an ideal value for each channel, which is the earliest time that the next cell should be sent and is based on the channel period. The scheduling table is partitioned into a fine table, which contains the portion of the channel value that is in units of cell intervals, and a coarse table, which contains the portion of the channel value that is in units of scheduling periods, where a scheduling period is defined as the maximum number of cell intervals that can be represented by a fine value.

Two processes take place in parallel during each scheduling period, the coarse process and the fine process. In general, the coarse process uses the ALU to decrement all non-zero coarse values. A post-decrement coarse value of '0' indicates that the ideal time for the associated channel falls in the next scheduling period.

During the fine process, the SVL determines which channel's cell to send next by comparing the fine values of those channels that are active and whose associated coarse values are '0'. The selected channel is the one with the smallest fine value. Partitioning the channel value table into a coarse value and a fine value means that only the fine values must be compared, which is one improvement of the present invention over the prior art. If the SVL finds more than one smallest fine value, the SVL must also determine which channel's cell to send first by using a prioritizer. Occasionally, prioritization will cause a cell to be pushed past the end of a scheduling period and into a carry-over interval at the beginning of the next scheduling period. Preferably, the carried-over cells are sent in the same order in which they would have been sent in the ideal scheduling period.

The comparator continually compares the fine value of the selected channel to the number of the current cell interval within the scheduling period until the fine value is less than or equal to the number of the current cell interval. When this condition is met, the comparator outputs a trigger signal to initiate the sending of the next cell of the selected channel and the fine process uses the ALU to adjust the channel value in the scheduling table using the channel period.

When at least one channel's bandwidth requirement is expected to occupy a significant portion of the total available bandwidth and a high quality of service must be maintained, it is desirable to use channel period time units that are smaller than a cell interval. The value in the scheduling table representing this lowest-order portion of the channel period is termed the extra-fine value. Although the extra-fine value is included in the ideal time, it is not involved in the smallest value comparison. When the channel value is adjusted after a cell is sent, the extra-fine value eventually accumulates to overflow a '1' into the fine value. Thus, instead of sending cells a fixed number of cell intervals apart, the overflow occasionally causes a cell interval to be skipped, lowering the effective bandwidth of the channel.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

Figure 1:
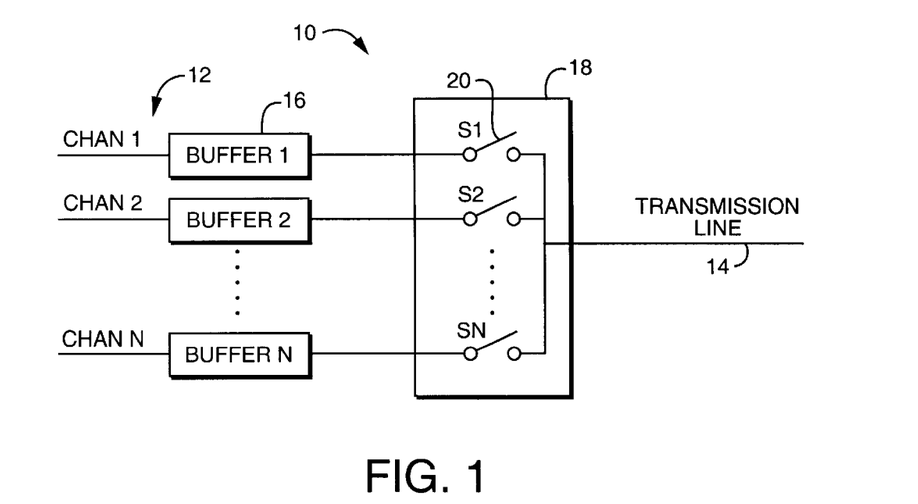
FIG. 1 shows a block diagram of a basic communications system with which the present invention is used.

The real-time scheduler of the present invention may be used to schedule service of multiple periodic requests for access to a shared resource. An important example is a communications system in which a number of virtual channels use a single transmission line to send information. Here the real-time scheduler determines when each channel can send information. In one form of a communications system, each channel's information is segmented into fixed-length cells, which are sent over the transmission line at time intervals that are spaced close enough to meet the bandwidth requirement of that channel. An abstraction of such a communications system is shown in FIG. 1. This system 10 has N channels 12 that use a single transmission line 14. Each channel has a buffer 16 so that information is not lost while the associated channel is waiting for access to the transmission line 14. Between the buffers and the transmission line is a multiplexer 18, which is essentially a large switch that directs one channel 12 at a time to the transmission line 14 by turning individual switches 20 on and off. Each switch 20 is turned on only for a cell interval, the length of time it takes to transmit one cell. In a system employing synchronous transfer mode (STM), the switches 20 are turned on in a repeating fixed sequence, for example $S_1, S_2, \ldots, S_N$. In a system employing asynchronous transfer mode (ATM), the switches 20 may be turned on in any order. The real-time scheduler of the present invention can determine the times at which the switches 20 are turned on in an ATM system.

In a general shared-resource system, the real-time scheduler must be initially set up according to system parameters, including the system clock, number of channels and the access interval. The system clock is the signal that the system uses to coordinate its activities, and is used by the real-time scheduler to synchronize its activities to that of the system. A channel represents a device that desires access to the shared resource. The access interval is the amount of uninterrupted time each channel needs access to the resource.

To operate within a communications system, the system parameters include the system clock, transmission line bit rate, cell size, and number of channels. The system clock is typically measured in very small units such as nanoseconds (ns). The bit rate is the speed at which individual data bits are sent over the transmission line and the cell size is the length, in bits, of the cell. The access interval or, in an ATM communications system, the cell interval, is the length of the cell, in bits, divided by the bit rate in bits per second. The number of channels is the maximum number of information signals to be multiplexed by the real-time scheduler. The system clock, bit rate, cell size, and number of channels are generally fixed values that are known when the real-time scheduler is being tailored for the particular application in which it is to be used. This, however, does not to preclude the possibility that the real-time scheduler may operate with variable clock rates, bit rates, cell sizes, and/or number of channels.

During operation, the scheduler is supplied with information indicating whether a channel is active at any given moment, and the channel period for each channel. When the real-time scheduler is used with a system that dynamically activates and deactivates channels, each channel has an associated channel flag $A_i$ that notifies the real-time scheduler whether or not its associated channel $D_i$ is active.

The channel period is the ideal period of time between which cells of the same channel are sent. This value is externally calculated based on the bandwidth requirement of the channel and is passed to the real-time scheduler when the channel is activated. The channel period has two basic parameters, the time unit and the range of time periods that can be specified. The time unit, also called the resolution, is the smallest increment of time that can be distinguished. The range of time periods is determined by the time unit and the bit length of the digital value that represents the channel period. In one embodiment, the time unit is the cell interval, which means that if, for example, the rate period for channel 10 has a value of 100, the next cell for channel 10 will be sent 100 cell intervals after the most recent channel 10 cell. In an alternate embodiment, the time unit is smaller than a cell interval, which is desired if the bandwidth requirements for at least one channel approach the maximum bandwidth of the transmission line. This alternative is discussed in greater detail below.

Figure 2:
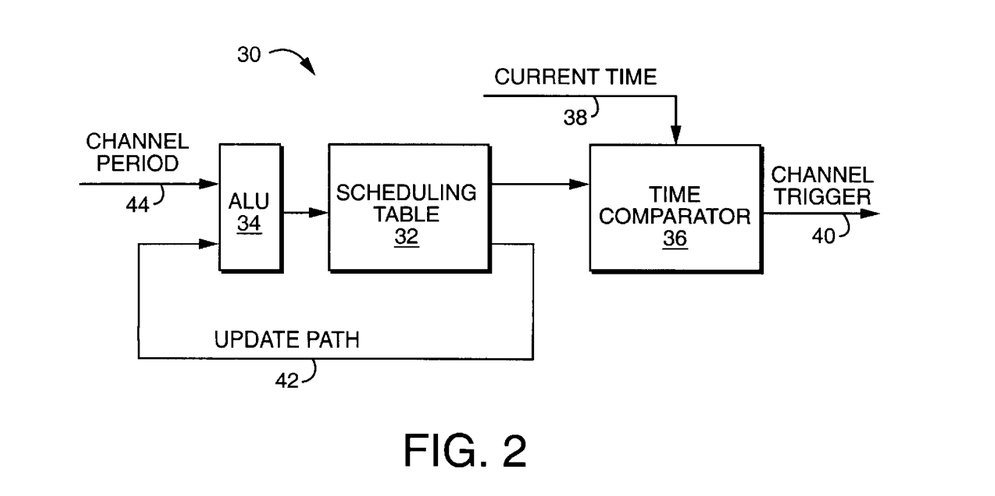
FIG. 2 shows a block diagram of a basic real-time scheduler.

A block diagram of a basic real-time scheduler 30 is shown in FIG. 2. The components include a scheduling table 32, an arithmetic unit 34, and a time comparator 36. Each channel has an ideal time value, the earliest time that the next cell should be sent, in the scheduling table 32. The real-time scheduler 30 waits until the time comparator 36 determines that the ideal time of a channel is less than or equal to the current time 38. That channel is sent a trigger 40 to send its cell and the arithmetic unit 34 increments the ideal time for that channel by its channel period 44 via the update path 42.

As the cell interval decreases with increases in the bit rate and as the number of channel periods that must be compared and incremented increases with the number of channels, the speed at which these functions must be performed increases proportionately. At some point, the arithmetic calculations and comparisons necessary to these functions cannot be performed quickly enough. For example, the present invention was initially conceived for use in an ATM communications system having a bit rate of 2.4 Gb/s, a cell size of 53 octets, and up to 64 dynamically-activated channels. In this system, the cell interval is approximately 176 ns. For the throughput requirements of this particular system, empirical data and calculation determined that a suitable length for the rate period using current technology is 14 bits, permitting a range of between 1 and $(2^{14}-1)=16,383$ time units between cell transmissions for the associated channel. Consequently, the time comparator must compare up to 64 14-bit values to the current time, all within 176 ns. The current invention provides a practical means for accomplishing this using a feasible amount of digital hardware.

Figure 3:
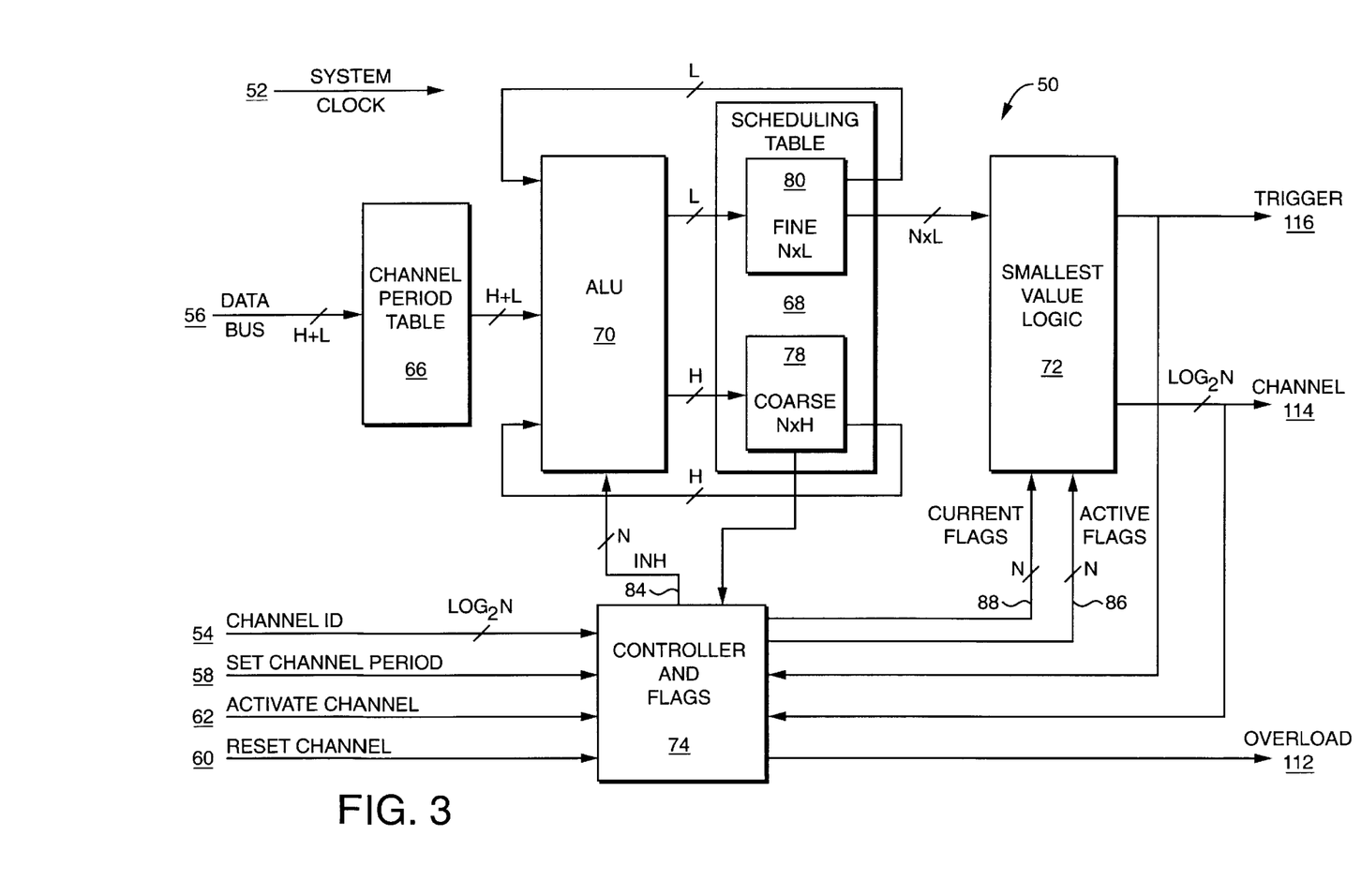
FIG. 3 shows a block diagram of the real-time scheduler of the present invention.

A block diagram of the real-time scheduler embodiment 50 of the present invention is shown in FIG. 3. The basic inputs are shown on the left side of the diagram, and include the system clock 52, the channel identifier (ID) 54, the data bus 56, the set channel period command 58, the channel reset command 60, and the channel activate command 62. The system clock 52 provides a time base for the scheduler. The channel ID 54 indicates to the scheduler which of the channels is currently being addressed for inputting information. The data bus 56 sends data to the addressed channel. The set channel period command 58 indicates that the data on the data bus 56 is a new channel period for the addressed channel. The channel reset command 60 indicates that the addressed channel is being deactivated. The channel activate command 62 indicates that the addressed channel is being activated.

Note that, in this implementation of inputting commands and data to the scheduler, each command has a single input and the data has a single parallel bus, and both are directed to the appropriate channel by a channel ID. This is but one possible implementation. Other implementations include separate inputs for each channel, serial data buses, and hybrids. The present invention contemplates that any method of inputting commands and data to the scheduler may be used.

The major internal components of the scheduler include the channel period table 66, the scheduling table 68, the arithmetic logic unit (ALU) 70, the smallest value logic block (SVL) 72, and the controller 74. The channel period table 66 holds the channel periods, the time period between transmission of cells of a channel, for all of the channels. The scheduling table 68 holds the current time value, the time until the next cell is to be sent, for all of the channels. The ALU 70 performs arithmetic functions on the values in the scheduling table 68. The SVL 72 determines which channel is to have its cell sent next and when the cell is sent. The controller 74 holds all internal flags and controls the operation of the scheduler 50. These components are described in more detail below.

An aspect of the present invention is the manner in which the values in the scheduling table 68 are represented and processed. The scheduling table 68 is partitioned into a coarse table 78 and a fine table 80. The coarse table 78 contains the coarse values, which are the high-order (most-significant) H bits of the scheduling table 68. The fine table 80 contains the fine values, which are the low-order (least-significant) L bits of the scheduling table 68. The fine value is in units of cell intervals. The coarse value is in units of scheduling periods, where a scheduling period is defined as $2^L$ cell intervals. The allocation of bits between the coarse table 78 and the fine table 80 is chosen so that all of the necessary processing can be performed during each scheduling period, and generally depends upon the current state-of-the-art in the technology used to build the scheduler. For the above example, a suitable division between the coarse and fine values as determined by calculation and experiment has the high-order 9 bits in the coarse value and the low-order 5 bits in the fine value, resulting in a scheduling period of $2^5*176=5,632$ ns.

Briefly, during each scheduling period, the real-time scheduler 50 determines the cells to be sent during the scheduling period. However, rather than search the entire scheduling table 68 for times that are equal to the current system time, a simultaneous parallel comparison is performed on all the values in the fine table 80 only. The coarse values are used to qualify which fine values are used in the comparison, as described below.

Two processes take place in parallel during each scheduling period, the coarse process and the fine process. The coarse process uses the ALU 70 to decrement the coarse value for each channel by '1', but only if the send time for the channel does not fall in the current scheduling period and cell transmission for the channel has not been delayed to the current scheduling period due to "carry-over" (see below). In the present implementation, an inhibit (INH) flag 84 is used to indicate whether or not the associated coarse value is to be decremented. A post-decrement coarse value of '0' indicates that the ideal time for the associated channel falls in the next scheduling period. In the present implementation, a future (FUT) flag is set for a channel that has a post-decrement coarse value of '0'.

In the fine process, the SVL 72 determines which channel's cell to send next, using as inputs the fine values, the active (ACT) flag 86 indicating that a channel is active, and the current (CUR) flag 88 indicating that the coarse value has been reduced to zero. The SVL 72 determines which of the fine values has the smallest value, but only compares the fine values of those channels for which the ACT and CUR flags are both on. Any method of implementing the SVL 72 that performs this determination is contemplated by the present invention. In the present implementation, an active channel is indicated by the ACT flag 86. Also, in the present implementation, the coarse values are not used directly, but rather the CUR flag 88 for each channel is used to indicate whether the coarse value for the associated channel is '0'. The CUR flags 88 are set at the beginning of each scheduling period for those channels whose coarse value became '0' during the previous scheduling period, as indicated by the FUT flags.

Figure 4:
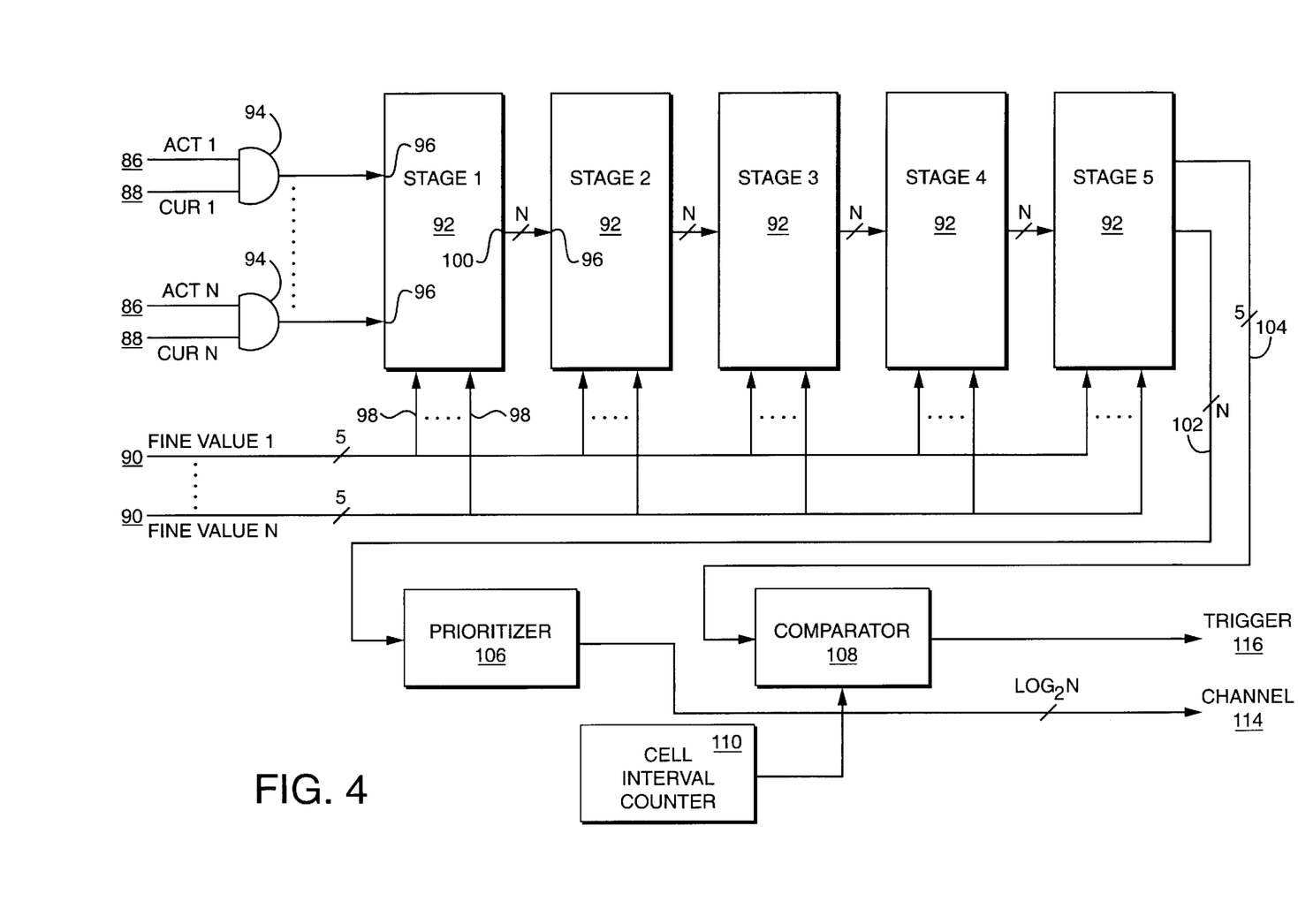
FIG. 4 shows a block diagram of the smallest value logic block.

In the above example, the result of partitioning the scheduling table is that 64 5-bit values are compared to each other, rather than 64 14-bit values of the basic real-time scheduler of FIG. 2. Obviously, comparing 5 bits to each other is a much faster process than comparing 14 bits and can easily be performed in a cell interval of 176 ns using state-of-the-art technology, an example of which is shown in FIG. 4. As shown, the SVL 72 consists of five stages 92 of logic, one stage for each bit of the fine value 90. Each channel is initially a candidate for selection if it is active and current, as indicated by the AND gate 94 combining the ACT flag 86 and CUR flag 88 into a candidate signal input 96 for the stage 92. Successive stages 92 each examine a single bit 98 of the fine value for all channels, starting with the most significant bit in stage 1, and pass the result as a candidate signal output 100 to the next stage 92. Essentially, at each stage 92, if the examined bit of all candidate channels is '1', all candidate channels become candidate channels for the next stage. If any examined bit is '0', only those candidate channels with a '0' bit become candidate channels for the next stage, and those with a '1' bit are no longer candidates. At the fifth stage, the output signals 102 correspond to all channels that have the same smallest fine value 104.

Figure 5:
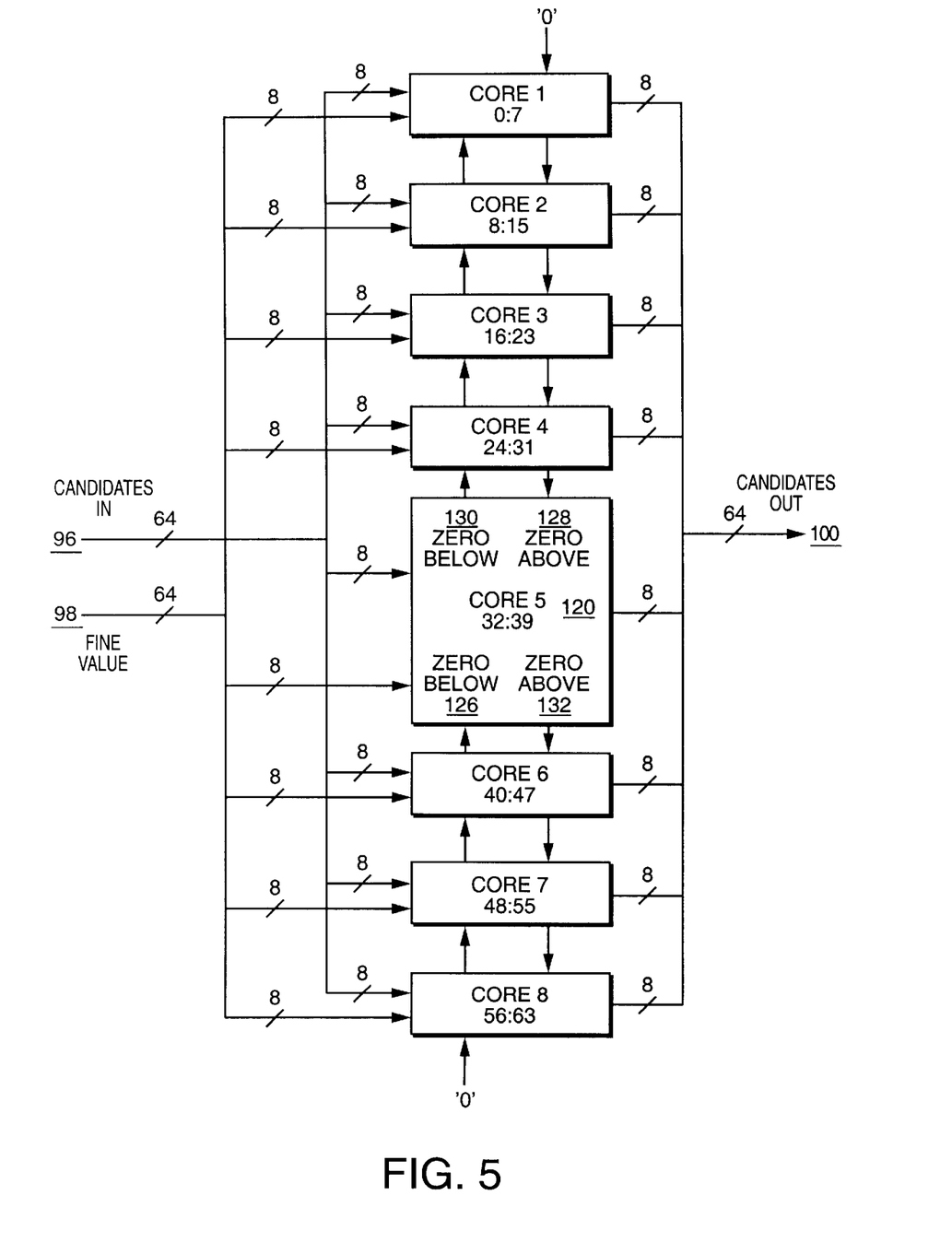
FIG. 5 shows a block diagram of one comparator stage of an implementation of the smallest value logic block of FIG. 4.

In the present implementation, shown in FIG. 5, each stage 92 is composed of eight core comparators 120. Each core comparator 120, one of which is shown in detail, examines the same bit 98 of eight channels as qualified by the input candidate signals 96. Zero signals 122, 124 are passed as a daisy-chain between the comparators 120 to indicate whether there are any channel '0' bits into any of the other comparators 120. If a comparator 102 detects a '0' bit or that an input zero signal 126, 128 is asserted, it sets its own zero signal outputs 130, 132 and prevents any non-'0' candidates from being passed through to the next stage via the output candidate signals 100.

There is always the possibility that the SVL 72 will find more than one smallest fine value, meaning that more than one cell should be sent during the same cell interval. In this event, a prioritizer 106 determines which channel's cell to send first. The prioritizer output 114 is the channel number of the next cell to send, denoted as the selected channel. In the simplest implementation, the highest priority channel is the one with the lowest channel number. This implementation essentially makes the prioritization dependent upon how the channels are numbered. However, it is also contemplated that implementations of the real-time scheduler may accept inputs that mark some channels as having higher priorities than others. The prioritization can be as simple as a binary flag so that any channel having the flag set has priority over any channel that does not have the flag set, to an elaborate system where all active channels are dynamically prioritized.

Occasionally, prioritization will cause a cell send time to be pushed past the end of the scheduling period. When this occurs, a process executes that transmits these delayed cells during a carry-over interval at the beginning of the next scheduling period, before any cells that have ideal times during that scheduling period. Preferably, the carried-over cells are sent in the same order in which they would have been sent in the previous scheduling period. The INH flag 84 remains set for each delayed channel so that the coarse values for these channels are not decremented by the coarse process. In the present implementation, when the carry-over interval occupies an entire scheduling period, an overload condition is indicated by an overload signal output 112, which means that data transmission may be delayed and the rate specification for some channels may not be met. It is also contemplated that the scheduler may be designed to handle multiple carry-over intervals so that overload conditions will be less likely to occur.

After the selected channel is determined, a comparator 108 compares the fine value of the selected channel to the number of the current cell interval in the scheduling period. The present embodiment of the scheduler uses a counter 110 to keep track of the current cell interval. If the fine value is less than or equal to the number of the current cell interval, the SVL 72 outputs a trigger signal 116 to initiate the sending of the next cell of the selected channel, the selected channel number 114 of which has already been determined by the prioritizer 106. In addition, the SVL 72 sends the selected channel number 114 and trigger 116 back to the controller 74 instructing it to adjust that selected channel's scheduling table value by its channel period so that the next ideal time for that channel is set.

The new fine value is determined by adding the channel period fine value to the current fine value. There will be an overflow if the sum is greater than $2^L 1$.

The adjustment of the coarse value is always done in the cell interval in which the cell is sent. This will be the period of the "ideal send time" if transmission is not delayed by conflicts with other channels, leading to its transmission during a succeeding carry-over interval. Because the coarse value is already '0', the new coarse value, measured from the beginning of the current scheduling period, is the channel period coarse value. However, the value placed in the scheduling table 68 is not necessarily the channel period coarse value. A channel with a coarse value greater than zero becomes current at the beginning of the scheduling period following the period in which the coarse value becomes zero. Therefore, in the normal case (no fine overflow and no carry-over), the coarse value to be stored is one less than the channel period coarse value. When there is a fine overflow, the coarse value stored will be one greater than normal, or exactly the channel period coarse value. If cell transmission takes place in a carry-over interval, the coarse value will be set one scheduling period later, so a further reduction by one from the channel period coarse value is required, meaning that the coarse value is two less than the channel period coarse value. When there is both a carry-over and fine overflow, the coarse value is one less than the channel period coarse value.

As mentioned above, it is desirable to use channel period time units that are smaller than a cell interval when the bandwidth requirement for at least one channel is expected to occupy a significant portion of the bandwidth of the transmission line and a high quality of service must be maintained. For example, suppose a 1.1 Gb/s bandwidth is needed in a system that has a maximum bandwidth of 2.4 Gb/s. If a channel period with a resolution of one cell interval is used, then a bandwidth of 1.1 Gb/s with a high quality of service cannot be achieved. The closest bandwidths available at this resolution are 1.2 Gb/s (channel period=2) and 0.8 Gb/s (channel period=3). Consequently, either too much bandwidth (1.2 Gb/s) is allocated, wasting a substantial portion ((1.2−1.1)/2.4≅4.2%) of the bandwidth, or not enough bandwidth (0.8 Gb/s) is allocated, potentially resulting in lost information.

The solution is to provide a channel period time unit that is smaller than one cell interval. Suppose that in the above example the channel period time unit is ½ of a cell interval (one additional least-significant bit of resolution) rather than one cell interval. In this case, the closest bandwidths available are 1.2 Gb/s (channel period=4) and 1.0 Gb/s (channel period=5). If another least-significant bit is added, a bandwidth of exactly 1.1 Gb/s can be allocated when the channel period=9. The value denoted by these new lowest-order bits is termed the extra-fine value.

Although the extra-fine value is included in the ideal time, it is not compared; only the L fine value bits are compared. Recall that after a cell is sent, the channel period is added to the current coarse and fine values to get the new ideal time for that channel. When the extra-fine value is used, it, too, is added to get the new ideal time. When the channel period has a non-'0' extra-fine value, the extra-fine value eventually accumulates to overflow a '1' into the fine value. Note that if the extra-fine value is '0', it has no effect. Thus, instead of sending cells a fixed number of cell intervals apart (assuming that channel prioritization does not cause a cell carry-over), the overflow caused by the extra-fine value occasionally causes a cell interval to be skipped. This skipped cell interval lowers the effective bandwidth of the channel to a value more closely approximating the bandwidth requirement.

In the example above, where the channel period=9 with a resolution of ¼ cell interval, Table I shows the repeating sequence of 9 cell intervals that will occur. As described above, the cell is sent when the fine value matches the cell interval number, and after the cell is sent, the combined fine value and extra-fine value are incremented by the channel period of 9 ($0001001_2$). Note that for most of the sequence there is only one cell interval between sent cells, but that there are two cell intervals between sent cells at intervals 8 and 9.

TABLE I

| Cell Interval | | Fine Value | | Extra-Fine Value | | Cell |
|---|---|---|---|---|---|---|
| $X_{10}$ | $X_2$ | $X_{10}$ | $X_2$ | $X_{10}$ | $X_2$ | Sent |
| 0 | 00000 | 0 | 00000 | 0 | 00 | Yes |
| 1 | 00001 | 2 | 00010 | 1 | 01 | No |
| 2 | 00010 | 2 | 00010 | 1 | 01 | Yes |
| 3 | 00011 | 4 | 00100 | 2 | 10 | No |
| 4 | 00100 | 4 | 00100 | 2 | 10 | Yes |
| 5 | 00101 | 6 | 00110 | 3 | 11 | No |
| 6 | 00110 | 6 | 00110 | 3 | 11 | Yes |
| 7 | 00111 | 9 | 01001 | 0 | 00 | No |
| 8 | 01000 | 9 | 01001 | 0 | 00 | No |
| 9 | 01001 | 9 | 01001 | 0 | 00 | Yes |

The present invention contemplates that the extra-fine value may be implemented in whatever way is feasible. In one implementation, there is a fixed-sized, permanent extra-fine value for each channel. If the extra-fine capability is not needed, this value is set to '0' and has no effect.

Figure 6:
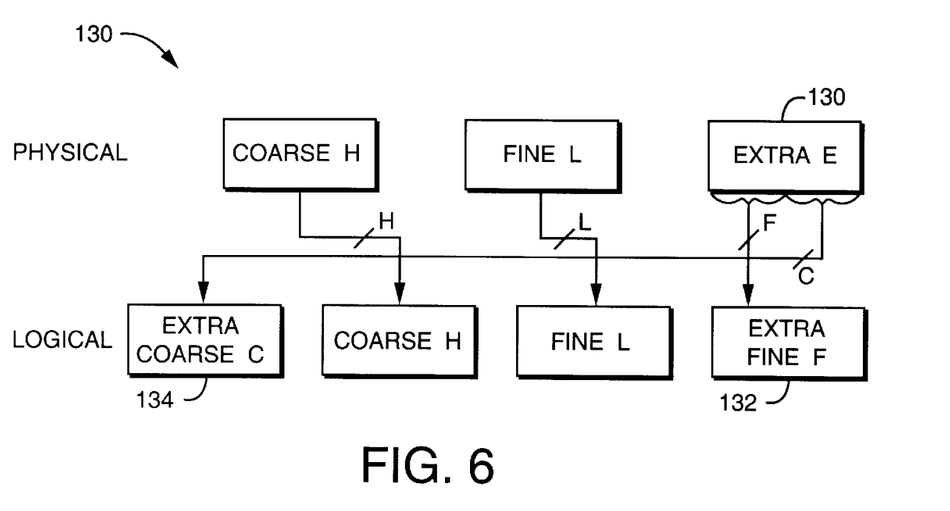
FIG. 6 shows a diagram of one embodiment of how the extra bits are organized to enhance the resolution of the channel period.

In another implementation, shown in FIG. 6, each channel has a set of E extra physical bits 130, any number F of which can be logically allocated to the extra-fine value 132. The remainder of the extra bits not so allocated, C=E−F, are logically allocated to an extra-coarse value 134. The extra-coarse value 134 provides a greater high-end range so that the effective range of the coarse value is increased from $2^H$ to $2^{H+C}$.

In the present implementation, the coarse value has 9 bits, the fine value has 5 bits, and there are 14 extra bits, which can be allocated in pairs to the extra-coarse value or the extra-fine value. The allocation is determined by a 3-bit scale-factor parameter S. 2S contiguous extra bits are allocated to the extra-coarse value and the remaining 14−2S contiguous extra bits are allocated to the extra-fine value. The present invention does not contemplate that this scale-factor method is the only way to allocate the extra bits among the extra-coarse and extra-fine values. Any method that can perform the allocation may be used.

When extra bits are implemented, they are included in the channel period table 66 and the scheduling table 68, and the ALU 70 can be configured to perform operations on them in the appropriate bit positions. For example, the ALU must send a coarse value overflow only to the extra-coarse value and an overflow from the extra-fine value only to the fine value. The data bus 56 is configured to be wide enough to accommodate the extra bits and any additional values needed to allocate the extra bits as desired. Alternatively, the data bus 56 is configured, with the appropriate control signals, to multiplex data for one channel into two or more write cycles.

Optionally, the scheduler provides the capability for externally reading any of the internal values and/or flags. For example, the scheduling table values may be read so that an external device will know when the next cell for a particular channel will be sent. Or an external device can read the states of the flags to know which channels may have lost data due to an overload condition.

Thus it has been shown and described a real-time scheduler which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A method for the real-time scheduling of access to a resource in a system, said system including at least one channel requiring periodic access to said resource for a predetermined access interval I, said real-time scheduling being performed during successive occurrences of a scheduling period P having a duration equal to an integer multiple of said access interval I, said periodic access occurring at a frequency specified by a channel period, each of said channels having a channel value representing when said periodic access is to next occur, said channel value including a fine value and a coarse value, said coarse value representing an integer multiple of said scheduling period, and said fine value representing an integer multiple of said access interval in the range of 0 to P-I, said method comprising the steps of:

(a) counting said access intervals during said scheduling period to provide a value indicating a current access interval;

(b) executing a coarse process during said scheduling period, said coarse process including subtracting one from each of said coarse values that is not zero at the beginning of said scheduling period; and (c) executing a fine process repeatedly during said scheduling period, said fine process including the steps of (i) determining a set of current fine values consisting of those of said fine values corresponding to said coarse values that indicate that said periodic access is to occur during said current scheduling period, (ii) determining a smallest current fine value of said set of current fine values, (iii) determining a selected channel from said channels corresponding to said smallest current fine value, (iv) waiting until said smallest current fine value is less than or equal to said current access interval value, (v) triggering said selected channel, and (vi) adjusting said channel value corresponding to said selected channel using said channel period corresponding to said selected channel.

2. The method of claim 1 wherein said at least one channel includes a plurality of channels, each of said channels having an active state or an inactive state, said active state being when said channel requires access to said resource and said inactive state being when said channel does not require access to said resource, and wherein said set of current fine values is further restricted to only those fine values corresponding to channels having said active state.

3. The method of claim 1 wherein a set of remaining current fine values includes all of said set of current fine values remaining at the end of a scheduling period immediately preceding said scheduling period, and said method includes executing a carry-over process prior to execution of said fine process, said carry-over process including the steps of (i) determining a smallest remaining current fine value of said set of remaining current fine values, (ii) determining a selected carry-over channel from said channels corresponding to said smallest remaining current fine value, (iii) triggering said selected carry-over channel, and (iv) adjusting said channel value corresponding to said selected carry-over channel using said channel period corresponding to said selected carry-over channel.

4. The method of claim 1 wherein said channel value further includes an extra-fine value representing a period in the range of 0 to I-V, where V evenly divides I, and whereby when said channel value is adjusted, any overflow of said extra-fine value causes said fine value to be increased by one.

5. A method for the real-time scheduling of access to a resource in a system, said system including a plurality of channels requiring periodic access to said resource for a predetermined access interval I, each of said channels having an active state or an inactive state, said active state being when said channel requires access to said resource and said inactive state being when said channel does not require access to said resource, said real-time scheduling being performed during successive occurrences of a scheduling period P having a duration equal to an integer multiple of said access interval I, said periodic access occurring at a frequency specified by a channel period, each of said channels having a channel value representing when said periodic access is to next occur, said channel value including a fine value and a coarse value, said coarse value representing an integer multiple of said scheduling period, and said fine value representing an integer multiple of said access interval in the range of 0 to P-I, said method comprising the steps of:

(a) counting said access intervals during said scheduling period to provide a value indicating a current access interval;

(b) executing a coarse process during said scheduling period, said coarse process including subtracting one from each of said coarse values that is not zero at the beginning of said scheduling period;

(c) executing a fine process repeatedly during said scheduling period, said fine process including the steps of (i) determining a set of current fine values consisting of those of said fine values corresponding to said channels having an active state and to said coarse values indicating that said periodic access is to occur during said current scheduling period, (ii) determining a smallest current fine value of said set of current fine values, (iii) determining a selected channel from said channels corresponding to said smallest current fine value, (iv) waiting until said smallest current fine value is less than or equal to said current access interval value, (v) triggering said selected channel, and (vi) adjusting said channel value corresponding to said selected channel using said channel period corresponding to said selected channel; and (d) executing a carry-over process prior to execution of said fine process, said carry-over process including the steps of (i) determining a set of remaining current fine values including all of said set of current fine values remaining at the end of a scheduling period immediately preceding said scheduling period, (ii) determining a smallest remaining current fine value of said set of remaining current fine values, (iii) determining a selected carry-over channel from said channels corresponding to said smallest remaining current fine value, (iv) triggering said selected carry-over channel, and (v) adjusting said channel value corresponding to said selected carry-over channel using said channel period corresponding to said selected carry-over channel.

6. The method of claim 5 wherein said channel value further includes an extra-fine value representing a period in the range of 0 to I-V, where V evenly divides I, and whereby when said channel value is adjusted, any overflow of said extra-fine value causes said fine value to be incremented by one.

7. A real-time scheduler for the real-time scheduling of access to a resource in a system, said system including at least one channel requiring periodic access to said resource for a predetermined access interval I, said real-time scheduling being performed during successive occurrences of a scheduling period P having a duration equal to an integer multiple of said access interval I, said periodic access occurring at a frequency specified by a channel period, said real-time scheduler comprising:

(a) a scheduling table for storing a channel value for each of said channels, said channel value representing when said periodic access is to next occur, said channel value including a fine value and a coarse value, said coarse value representing an integer multiple of said scheduling period, and said fine value representing an integer multiple of said access interval in the range of 0 to P-I;

(b) a means for providing a value indicating a current access interval during said scheduling period;

(c) a decrementer for performing a decrementing operation during said scheduling period, said decrementing operation including subtracting one from each of said coarse values that is not zero at the beginning of said scheduling period;

(d) a smallest value logic block for repeatedly determining a smallest current fine value of a set of current fine values during said scheduling period, said set of current fine values consisting of those of said fine values corresponding to said coarse values indicating that said periodic access is to occur during said current scheduling period;

(e) a prioritizer for determining a selected channel from said channels corresponding to said smallest current fine value;

(f) a comparator for sending a trigger to said selected channel when said smallest current fine value is less than or equal to said value of said current access interval; and (g) an adjuster for adjusting said channel value corresponding to said selected channel using said channel period corresponding to said selected channel.

8. The real-time scheduler of claim 7 wherein said at least one channel includes a plurality of channels, each of said channels having an active state or an inactive state and a means for switching between said states, said active state being when said channel requires access to said resource and said inactive state being when said channel does not require access to said resource, and wherein said set of current fine values is further restricted to only those fine values corresponding to channels having said active state.

9. The real-time scheduler of claim 7 wherein a set of remaining current fine values includes all of said set of current fine values remaining at the end of a scheduling period immediately preceding said scheduling period, and said real-time scheduler includes a carry-over means that ensures that each channel corresponding to one of said fine values in said set of remaining current fine values is triggered before said fine process is executed for said scheduling period.

10. The real-time scheduler of claim 7 wherein said channel value further includes an extra-fine value representing a period in the range of 0 to I-V, where V evenly divides I, and whereby when said channel value is adjusted, any overflow of said extra-fine value causes said fine value to be incremented by one.

11. A real-time scheduler for the real-time scheduling of access to a resource in a system, said system including at least one channel requiring periodic access to said resource for a predetermined access interval I, said real-time scheduling being performed during successive occurrences of a scheduling period P having a duration equal to an integer multiple of said access interval I, said periodic access occurring at a frequency specified by a channel period, said real-time scheduler comprising:

(a) a means for storing a channel value for each of said channels, said channel value representing when said periodic access is to next occur, said channel value including a fine value and a coarse value, said coarse value representing an integer multiple of said scheduling period, and said fine value representing an integer multiple of said access interval in the range of 0 to P-I;

(b) a means for providing a value indicating a current access interval during said scheduling period;

(c) a means for performing a decrementing operation during said scheduling period, said decrementing operation including subtracting one from each of said coarse values that is not zero at the beginning of said scheduling period;

(d) a means for repeatedly determining a smallest current fine value of a set of current fine values during said scheduling period, said set of current fine values consisting of those of said fine values corresponding to said coarse values indicating that said periodic access is to occur during said current scheduling period;

(e) a means for determining a selected channel from said channels corresponding to said smallest current fine value;

(f) a means for sending a trigger to said selected channel when said smallest current fine value is less than or equal to said value of said current access interval; and (g) a means for adjusting said channel value corresponding to said selected channel using said channel period corresponding to said selected channel.

12. The real-time scheduler of claim 11 wherein said at least one channel includes a plurality of channels, each of said channels having an active state or an inactive state and a means for switching between said states, said active state being when said channel requires access to said resource and said inactive state being when said channel does not require access to said resource, and wherein said set of current fine values is further restricted to only those fine values corresponding to channels having said active state.

13. The real-time scheduler of claim 11 wherein a set of remaining current fine values includes all of said set of current fine values remaining at the end of a scheduling period immediately preceding said scheduling period, and said real-time scheduler includes a carry-over means that ensures that each channel corresponding to one of said fine values in said set of remaining current fine values is triggered before said fine process is executed for said scheduling period.

14. The real-time scheduler of claim 11 wherein said channel value further includes an extra-fine value representing a period in the range of 0 to I-V, where V evenly divides I, and whereby when said channel value is adjusted, any overflow of said extra-fine value causes said fine value to be incremented by one.

* * * * *